United States Patent
Yuan

(12) 
(10) Patent No.: US 6,347,999 B1
(45) Date of Patent: Feb. 19, 2002

(54) PINBALL SIMULATOR GAME SYSTEM

(76) Inventor: Jay C. Yuan, 45027 Cougar Cir., Fremont, CA (US) 94539

( * ) Notice: Subject to any disclaimer, the term of this patent is extended or adjusted under 35 U.S.C. 154(b) by 0 days.

(21) Appl. No.: 09/442,879

(22) Filed: Nov. 18, 1999

(51) Int. Cl.$^7$ .................................................. A63F 13/00
(52) U.S. Cl. ................................. 463/46; 463/30; 463/3; 472/60; 472/61
(58) Field of Search .......................... 463/46, 36, 39, 463/30, 31, 7, 2, 1, 3; 273/148 B; 472/59, 60, 61, 95, 96, 97, 98, 99, 103, 104, 105; 434/29, 55, 61, 62, 65, 43, 44; 482/8

(56) References Cited

U.S. PATENT DOCUMENTS

| | | | |
|---|---|---|---|
| 4,632,341 A | * 12/1986 | Repperger et al. | 244/230 |
| 4,817,950 A | * 4/1989 | Goo | 273/148 B |
| 5,018,973 A | 5/1991 | Alet et al. | 434/62 |
| 5,195,746 A | 3/1993 | Boyd et al. | 273/148 |
| 5,209,662 A | 5/1993 | Fujita et al. | 434/61 |
| 5,299,810 A | 4/1994 | Pierce et al. | 273/434 |
| 5,366,375 A | 11/1994 | Sarnicola | 434/37 |
| 5,405,152 A | * 4/1995 | Katanics et al. | 463/36 |
| 5,415,550 A | * 5/1995 | Aoki et al. | 434/61 |
| 5,464,213 A | * 11/1995 | Lee et al. | 273/121 A |
| 5,490,784 A | 2/1996 | Carmein | 434/55 |
| 5,584,696 A | * 12/1996 | Walker et al. | 434/43 |
| 5,611,731 A | 3/1997 | Bouton et al. | 463/37 |
| 5,655,909 A | * 8/1997 | Kitchen et al. | 434/44 |
| 5,662,523 A | 9/1997 | Yasumaru et al. | 463/30 |
| 5,700,193 A | 12/1997 | D'Achard Van Enchut | 463/3 |
| 5,736,986 A | * 4/1998 | Sever, Jr. | 434/247 |
| 5,846,134 A | * 12/1998 | Latypov | 463/46 |
| 5,848,939 A | 12/1998 | Smith | 472/60 |
| 5,857,917 A | 1/1999 | Francis et al. | 472/60 |
| 5,860,861 A | * 1/1999 | Lipps et al. | 463/36 |
| 5,980,256 A | * 11/1999 | Carmein | 434/55 |
| 6,004,243 A | * 12/1999 | Ewert | 482/8 |
| 6,007,338 A | * 12/1999 | DiNunzio et al. | 434/55 |
| 6,152,856 A | * 11/2000 | Studor et al. | 482/8 |
| 6,179,619 B1 | * 1/2001 | Tanaka | 434/69 |

* cited by examiner

*Primary Examiner*—Michael O'Neill
(74) *Attorney, Agent, or Firm*—Intellectual Property Law Group LLP; Otto O. Lee; Takashi Hashimoto

(57) ABSTRACT

The present invention discloses a new pinball simulator game system in which a view from a perspective of a pinball is displayed such that a player experiences a sensation as riding inside the pinball. The experience is further enhanced with a game console mounted on top of a motion base that moves the player inside the game console according the pinball's movement.

8 Claims, 3 Drawing Sheets

PINBALL SIMULATOR GAME SYSTEM

BACKGROUND

This invention relates generally to electronic games, and specifically, to a simulation pinball game wherein the simulation creates a new experience to a player a sensation of riding a pinball.

Pinball machines are very popular and have been played in video arcades, and bars for many decades. The classic pinball machine constitutes mainly a slightly tilted table that allows a pinball to roll, bounce and bump against various obstacles. The game usually starts by the player shooting the pinball from one lower end of the table to the upper end of the table, and through gravity the ball will move and bounce along various paths against various stationery obstacles. The player receives different scores based on the obstacles or paths that the pinball travels. The pinball will eventually falls to the lower end of the table after traveling various different paths. The object of the game is for the player to keep the ball from falling into a gap between two flippers at one lower end of the table. The player can control the movement of the pinball by moving the two movable flippers when the ball rolls back to the proximity of the flippers in order to keep the pinball from falling into the gap. This is a game that requires very accurate eye-hand coordination. The player must use the right force and at the exact timing, the flippers will propel the falling pinball back to the upper part of pinball table to collide with other obstacles and travel in other paths to accumulate higher scores.

Due to the popularity of the classic pinball machine, computerized games simulating pinball machine games are also available. However, in both a real pinball machine and a pinball simulator game being played on a computer or a electronic hand-held device, a player's interaction with the game is limited to controlling the flippers and observing the movement and scoring of the pinball on top of the pinball table. The player does not actively experience the collision and circuitous paths traveled by the pinball. The player merely needs to concentrate only when the pinball is falling to the lower end of the table and operate one or both flippers in order to avoid the pinball from falling into the gap. Consequently, the game is less demanding, and a player does not need to focus constantly on the play of the game. The pinball game therefore may be less interesting to a player who prefers constant interaction and excitement.

Furthermore, the player of pinball games remains generally stationary during the game. Only some of the more aggressive players may try to push or shake the pinball machines to guide the pinball to the players' desired paths, or to avoid the ball from falling into the gap between the flippers. Such shaking often damages the pinball machine and is extremely costly to the arcade owners to repair the pinball machines. Therefore, more modern and sophisticated pinball machines generally have built-in vibrating sensors to "punish" the aggressive players. When the pinball machine senses that it is being pushed or shaken, the machine will automatically disable the flippers or even end the pinball game abruptly. This demonstrates that many players of the pinball game prefer to have a more exciting and continuously moving game so that their entire body and senses of the player are in motion along with the pinball.

Therefore there is a need to incorporate more interactive features into the classic pinball machine, so that a player can enjoy more fully the excitement of playing a pinball game. In addition, there is a further need to provide the player actual moving sensations during the game to make the gaming experience even more exciting.

SUMMARY

The present invention satisfies these needs. The invention combines the advantages of a pinball game and a moving mechanical riding device.

In one embodiment, the invention is a pinball simulator game system with a display device adapted to display from a pinball's perspective moving in a game area of the simulated pinball machine to a player. In a preferred embodiment, the pinball simulator game also comprises a game console electrically connected to the display device, with a controller mounted inside the game console for the player to control and interact with the pinball. In another embodiment, the pinball simulator game further comprises a computer electrically connected to the display device; a software to provide instructions to the computer to generate continuous moving images of the view from the perspective of the pinball onto the display device.

In another preferred embodiment, the game console further comprises means for controlling a movement of the pinball through sending electronic signals to the computer such that the player experiences the sensation of being a pinball. In another preferred embodiment, the pinball simulator game system the game console is mounted on top of the motion base, such that the computer directs the motion base to move according to a movement of the pinball, such that the player has a sensation of being the pinball.

In another embodiment the pinball simulator game system further comprises the display device adapted to display a top down view of the ball moving in the game area.

In yet another embodiment the pinball simulator game system has a roller coaster rail enclosed in the game area, such that when the pinball moves along the roller coaster rail, the player experiences a roller coaster ride sensation. In yet another preferred embodiment, the pinball simulator game system has means to control the computer and means to speed up the pinball and control a trajectory of the pinball.

In another embodiment the pinball simulator game simulates an underwater roller coaster ride when a game ends. In yet another embodiment, the pinball simulator game system has means to control the computer include means to speed up the pinball, and consumes fuel to speed up and the fuel is supplied during a play of a game.

In another preferred embodiment, the pinball simulator game further contains a stereo sound system with at least one speaker in the game console that generates sound effects according to the movement of the pinball.

DRAWINGS

These and other features, aspects, and advantages of the present invention will become better understood with regard to the following description, appended claims, and accompanying drawings where:

DETAILED DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

This invention discloses a simulation game system in which a pinball machine is simulated with a computer to create a sensation in a player that the player is moving and bouncing like a pinball. The sensation as a pinball is created by the display of a video screen, which is controlled by a computer system to show the visual effect as if the player were sitting inside the pinball.

Figure 1:
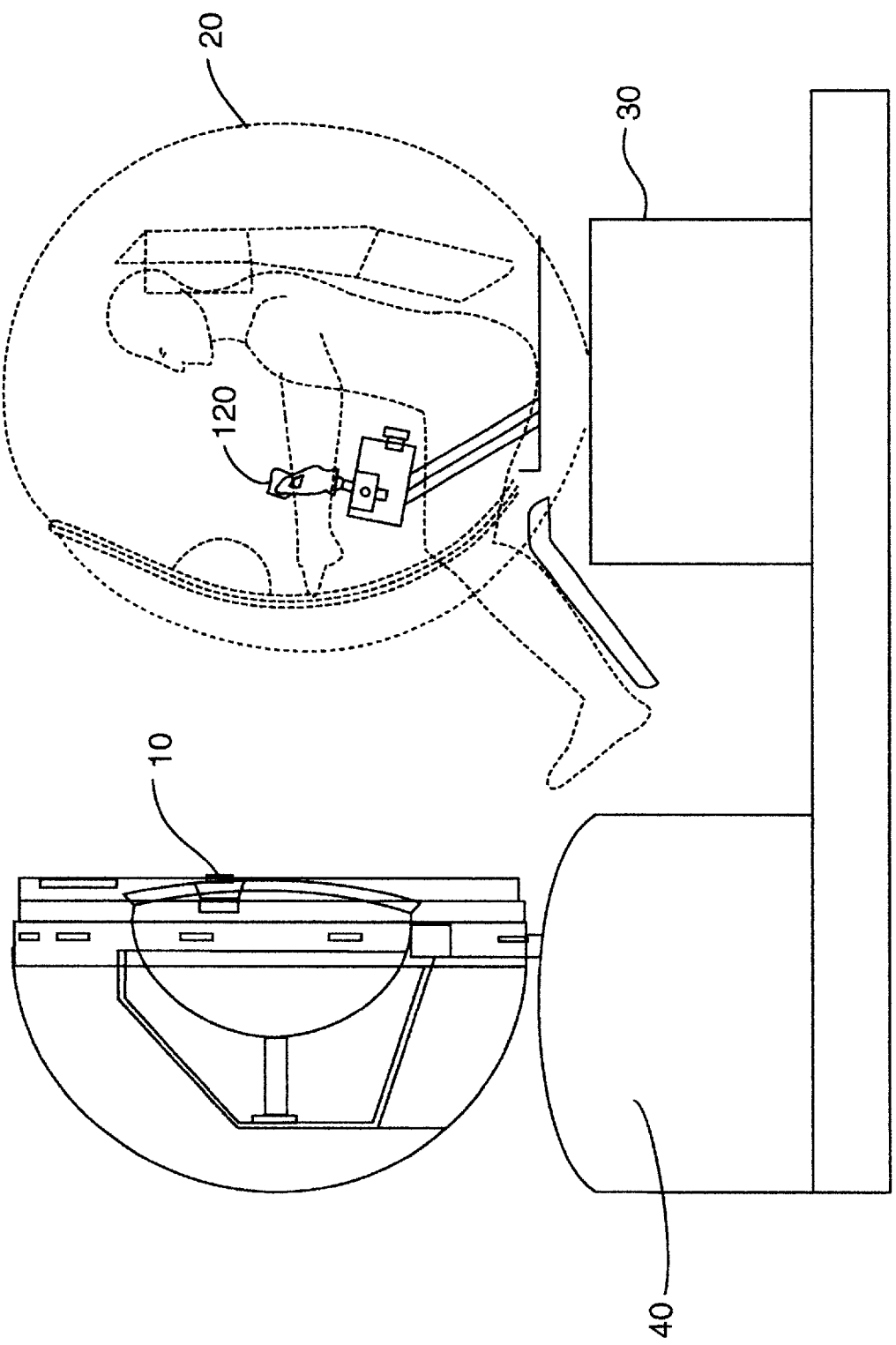
FIG. 1 is a perspective view of one presently preferred embodiment of a pinball simulator game system.

In one embodiment, the pinball simulator game system is a combination of a console with a screen graphics display and sound system that a player can interact through the control mechanisms in the console. FIG. 1 shows one embodiment of the game system. The system includes a video display screen 10, a game console 20, a computer 30 and a motion base 40. A player sits inside the console to control the play of the pinball game. The video screen is positioned substantially in line with the eye level of the player. The video display is generated by a computerized central processing unit (CPU). The CPU is programmed with software to reflect the movement of a pinball in a game area of a pinball table, and to record the scores.

Figure 2:
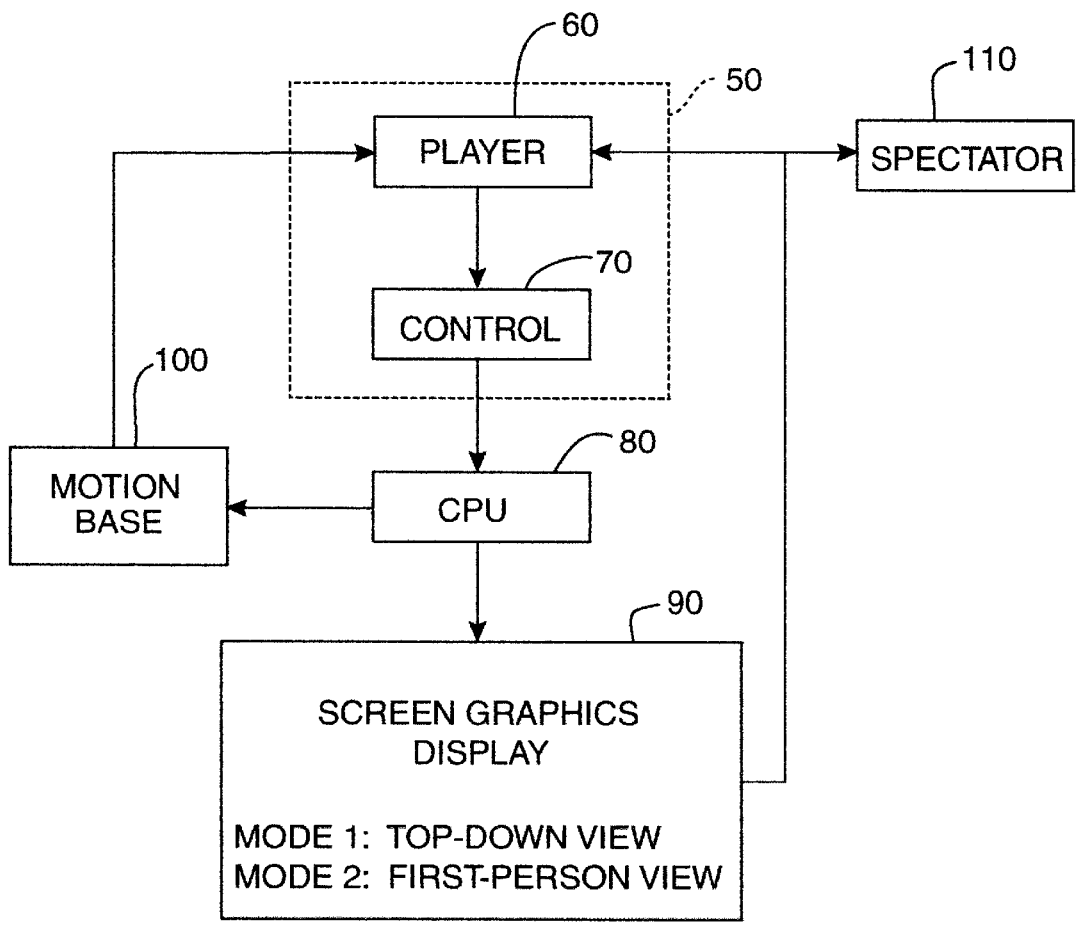
FIG. 2 is a block diagram showing the components of one preferred embodiment of a pinball simulator game system wherein a player actively control the game system.

FIG. 2 is a diagram showing the components of the game system and their relationships. The game console 50 includes a player 60 and a control mechanism 70. The player can control the simulated pinball by moving the control mechanism 70 which sends a electronic signal to the central processing unit (CPU) 80 of the game system, which in turn processes and reflects the command via the screen graphics display 90.

In another embodiment of the invention, the video display comprises two interchangeable viewing modes. The viewing mode a top-down view. The top-down view is a bird eye's view of the pinball machine as viewed from above. The second viewing mode is a first-person view as seen from the perspective of the pinball. The top-down view displays the normal views from the perspective of a player standing by the pinball table. In comparison, the first-person view is an imaginary view as if the player sat inside the pinball while the pinball the first-person view will create a sensation in the player that the player is riding with the pinball. Also a number of spectators may also view the screen graphics display.

In a preferred embodiment, the sensation of riding with the pinball is further enhanced by the inclusion of a motion base 100, on top of which the game console is mounted. The motion base is electrically connected to the CPU and moves according to a real time movement of the pinball as displayed on the video screen. The CPU controls the movement of the console to create a sensation in the player of accelerating, decelerating, rolling, bouncing and colliding as is well known in the art. The movement of the console assists the player to more fully enjoy the sensation as being the virtual pinball.

In another preferred embodiment, to enhance the sensation in the player as moving with a pinball, a stereo surround sound system controlled and synchronized with the movement of the pinball by the CPU containing at least one speaker is affixed inside the game console. A number of sound effects are generated by the sound system according to various different types of the pinball movements.

The above describes certain embodiments of this invention in which a player may enjoy the excitement as being a virtual pinball. Since this simulation game creates a sensation that the player rides inside a pinball, the game uniquely combines the play of a pinball with other ride games. The following describes some more specific features of the game that takes advantage of this unique combination of pinball and ride games.

In a classic pinball machine game, the game ends when the last pinball drops past gap between the two flippers to the bottom. In one preferred embodiment, when the pinball simulator game ends, the pinball will run through an underwater roller coaster. Accordingly, this simulation pinball game will create a sensation in the player of riding an underwater roller coaster at the end of every game. During the ride, the first-person view may be switched to a real scenery ride to add visual excitement.

In another preferred embodiment, the simulated pinball machine table contains certain structures in the game area similar to a roller coaster rail. When the pinball enters the structure, the player will enjoy a sensation of riding a roller coaster. The sensation is enhanced by switching the display to the first-person view, so the player can enjoy the scenes while passing along the roller coaster. In yet another embodiment, during the simulated roller coaster ride, the scene may change to a simulated scenery of a real roller coaster ride to add visual excitement. The sensation can be further enhanced by the use of the motion base to simulate the movement of the pinball along the roller coaster. The combination of the visual and body sensation of movement creates a unique fantasy in the player as a pinball moving along a roller coaster.

People skilled in the art should be able to add different types of ride to the pinball simulator game system by adding various different special designs to the game area of the pinball machine table.

The pinball simulator game may also allow a player to actively control the speed of a pinball. In a preferred embodiment, the player may add thrust to a moving pinball so that the pinball may speed up for a limited time. The game may assign certain "fuel" level to a play to be used to propel the pinball. The player may add thrust the ball only when the pinball has a positive "fuel" level. During the play, the pinball may pick up "fuel" when hitting certain targets, or when the score reaches a certain level. This feature may help the pinball to pick up enough speed to get onto certain structures that require a minimum speed to enter, such as a roller coaster rail.

Figure 3:
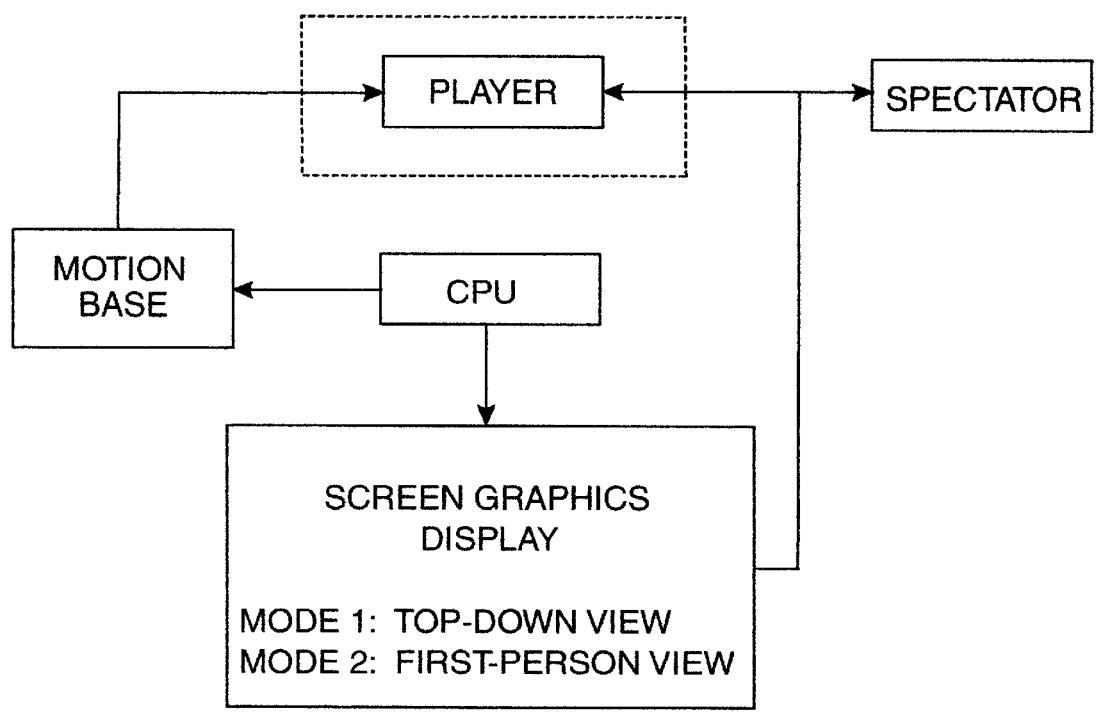
FIG. 3 is a block diagram showing the components of one preferred embodiment of a pinball simulator game system wherein a player does not control the game system.

The following is a detailed description of the control mechanisms that a player may use to interact with the game. It should be understood that for a player to enjoy the sensation of a pinball ride, the player does not have to control the game system. Instead the player may passively view the video game or ride with the aid of a motion base. FIG. 3 is a demonstration of a passive game where the player does not have direct control of the CPU and thus does not actively interact with the game.

The pinball simulator game system preferably includes a pair of joystick, each with a button and a trigger. The joysticks 120 are attached to the arms of the seat located inside the game console as shown in FIG. 1. The following description explains one preferred control mechanism.

In one preferred embodiment of the control mechanism there are two ways to change between the top-down view and the first-person view: one way is to depress the buttons on the joysticks; the other way is to push both joysticks forward or pull both joysticks backward.

When at the top-down view, the player may use the triggers on the joysticks to control the flippers on the pinball table. When at the first-person view, the triggers on the joysticks become the control of the thrusters. The player can use the thrusters to propel the pinball for a limited time, until the "fuel" is used up.

While this novel invention as disclosed herein is fully capable to achieving the stated objectives, it is to be understood that nothing shall be construed a limitation of the present invention, other than the limitations set forth in the appended claims.

What is claimed is:

1. A pinball simulator game system comprising:
   a) a computerized central processing unit;
   b) a game console with a seat to receive a player, the player having means to control the computerized central processing unit;
   c) a video display screen displaying a video graphics of a pinball game, the video graphics of the pinball game being a first-person view from the perspective of a pinball, and being generated by the computerized central processing unit;
   d) a motion base, the motion base being controlled by the computerized central process unit to move according to a movement of the pinball, wherein the console is mounted on the motion base, such that the player moves according to the movement of the pinball, wherein the player has a sensation of being a pinball and moving with the pinball.

2. A pinball simulator game system adapted for use by a player, the game system comprising:
   a) a display device which is adapted to display a view from a perspective of a pinball moving in a game area;
   b) a game console electrically connected to the display device, the game console including a controller which is adapted to be controlled by the player to interact with the pinball; and
   c) a roller coaster rail enclosed in the game area, such that when the pinball moves along the roller coaster rail, the player experiences a roller coaster ride sensation.

3. The pinball simulator game system of claim 2 further comprising an underwater roller coaster ride when a game ends.

4. A pinball simulator game system adapted for use by a player, the game system comprising:
   a) a display device being adapted to display a view from a perspective of a pinball moving in a game area;
   b) a game console electrically connected to the display device, the game console including a controller being adapted to be controlled by the player to interact with the pinball;
   c) a computer electrically connected to the display device;
   d) a software to provide instructions to the computer to generate continuous moving images of the view from the perspective of the pinball onto the display device; and
   e) means for controlling a movement of the pinball through the computer including a means to speed up the pinball, such that the player experiences a sensation of being a pinball.

5. A pinball simulator game system of claim 4, wherein the pinball consumes fuel to speed up and the fuel is supplied during a play of a game.

6. A pinball simulator game system adapted for use by a player, the game system comprising:
   a) a display device which is adapted to display a view from a perspective of a pinball moving in a game area;
   b) a game console electrically connected to the display device, the game console including a controller which is adapted to be controlled by the player to interact with the pinball;
   c) a computer electrically connected to the display device;
   d) a software to provide instructions to the computer to generate continuous moving images of the view from the perspective of the pinball onto the display device;
   e) a motion base electrically connected to the computer such that the motion base moves according to a movement of the pinball;
   f) a stereo sound system that plays sound according to the movement of the pinball; and
   g) a roller coaster rail enclosed in the game area, such that when the pinball moves along the roller coaster rail, the player experiences a roller coaster ride sensation.

7. A pinball simulator game system adapted for use by a player, the game system comprising:
   a) a display device which is adapted to display a view from a perspective of a pinball moving in a game area;
   b) a game console electrically connected to the display device, the game console including a controller to speed up the pinball, the controller being adapted to be controlled by the player to interact with the pinball;
   c) a computer electrically connected to the display device;
   d) a software to provide instructions to the computer to generate continuous moving images of the view from the perspective of the pinball onto the display device;
   e) a motion base electrically connected to the computer such that the motion base moves according to a movement of the pinball; and
   f) a stereo sound system that plays sound according to the movement of the pinball.

8. A pinball simulator game system adapted for use by a player,
   a) a display device being adapted to display a view from a perspective of a pinball moving in a game area;
   b) a game console electrically connected to the display device, the game console including a controller being adapted to be controlled by the player to interact with the pin ball;
   c) a computer electrically connected to the display device;
   d) a software to provide instructions to the computer to generate continuous moving images of the view from the perspective of the pinball onto the display device;
   e) means for controlling a movement of the pinball through the computer, such that the player experiences a sensation of being a pinball; and
   f) a motion base, wherein the console is mounted on top of the motion base and wherein the computer directs the motion base to move according to a movement of the pinball, such that the player has a sensation of riding inside the pinball.

\* \* \* \* \*